ical device of the present character
UNITED STATES PATENT OFFICE.

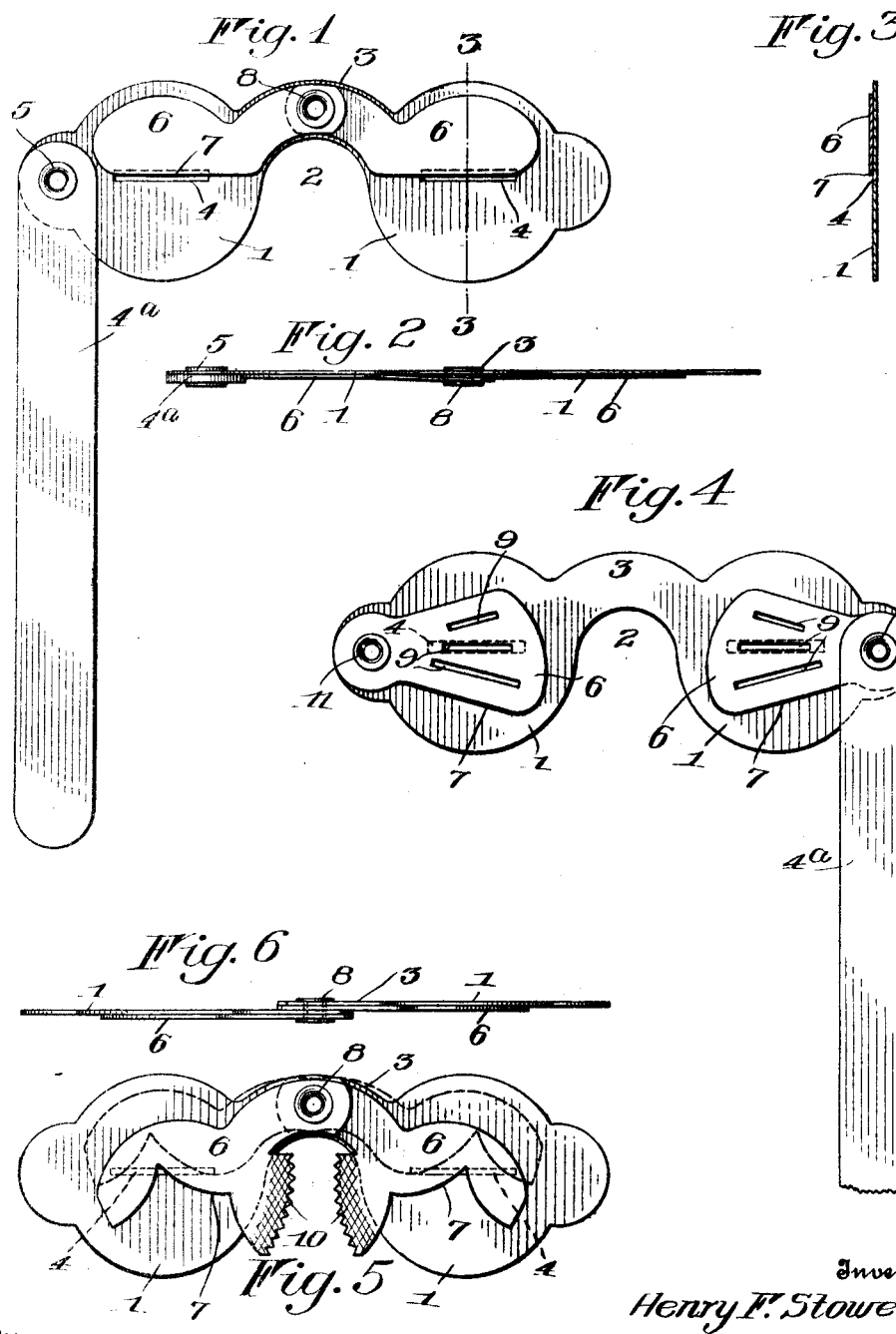

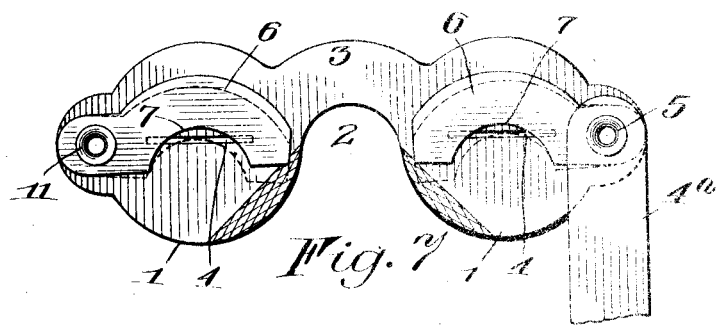
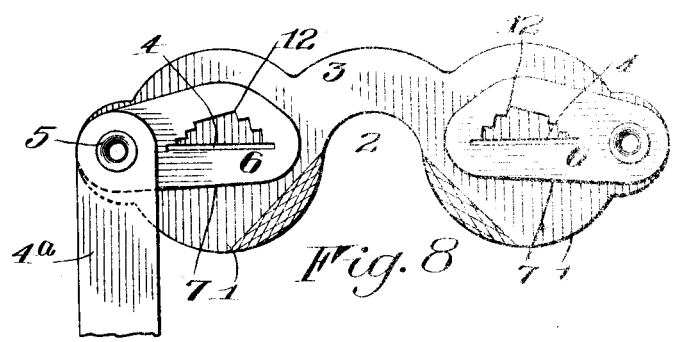
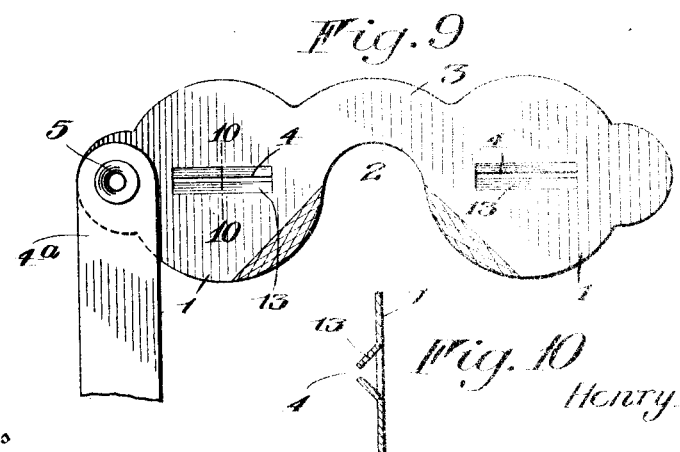

HENRY F. STOWELL, OF ROCHESTER, NEW YORK.

OPTICAL DEVICE FOR VIEWING MOVING PICTURES.

1,141,432.  Specification of Letters Patent.  Patented June 1, 1915.

Application filed November 3, 1914. Serial No. 870,144.

*To all whom it may concern:*

Be it known that I, HENRY F. STOWELL, of Rochester, in the county of Monroe and State of New York, have invented certain new and useful Improvements in Optical Devices for Viewing Moving Pictures; and I do hereby declare the following to be a full, clear, and exact description of the same, reference being had to the accompanying drawings, forming a part of this specification, and to the reference-numerals marked thereon.

My present invention relates to optics and it has for its object to provide certain improvements in devices of the nature shown and described in my prior application, Serial No. 863,356, filed September 24, 1914, wherein the principle of the stenopaic slit or opening is utilized for the purpose of reducing the illumination at certain marginal points where the rays enter the eye and thus reduce the flickering appearance of moving pictures.

The improvement seeks to render a device of this character easily alterable to vary the amount of light admitted to the eye and hence suitable for the most efficient use by different people whose acuteness of vision is not the same.

To these and other ends the invention consists in certain improvements and combinations of parts all as will be hereinafter more fully described, the novel features being pointed out in the claims at the end of the specification.

In the drawings: Figure 1 is a front elevation of an optical device constructed in accordance with and illustrating one embodiment of my invention; Fig. 2 is a top edge view thereof; Fig. 3 is a section taken substantially on the line 3—3 of Fig. 1; Fig. 4 is a front elevation of a modified form of the device; Fig. 5 is a front elevation of another modification; Fig. 6 is a top edge view of the device shown in Fig. 5; Fig. 7 is a front elevation of a third modification; Figs. 8 and 9 are similar views of two other modifications, and Fig. 10 is a section taken substantially on the line 10—10 of Fig. 9.

Similar reference numerals throughout the several figures indicate the same parts.

In my said former application, I have explained at length the general functions of an optical device of the present character and I need not therefore explain it so fully herein. There is provided a pair of eyepieces 1—1 preferably composed of two integral disks cut from a relatively thin but stiff sheet of black paper or other opaque material. A suitable opening 2 to accommodate the nose of the wearer is provided between them and above this opening they are connected by a bridging portion 3. Each disk or eyepiece contains a centrally arranged stenopaic slit or opening 4 that may, for average purposes, be made about a twentieth of an inch in width. The device is held before the eyes in the case of Figs. 1, 4, 7, 8 and 9 by a lorgnette handle 4ª that is preferably pivoted at the outer edge of one of the eyepieces by means of an eyelet so that it is foldable to a position parallel with the bridge. When so held, the pictures are viewed through the openings 4 which, because of their restricted nature, cut off most of the excess or marginal rays and prevent the strain upon the eye incident to the flickering effects that otherwise result from the excessive illumination.

Those individuals possessing exceptionally acute vision obtain the best results with a very narrow opening of even less than the average width of about a twentieth of an inch, above mentioned, while others require a much wider opening to obtain good definition and, because of their optical insensitiveness, can use such wider opening without the flickering effect of the pictures becoming noticeable to them.

I therefore, in the practice of my present invention, provide a simple, cheap and convenient means for varying the width of the openings to suit the particular needs of the individual users.

Referring first to Fig. 1, I there employ a pair of movable shutter members 6 each having an obscuring edge 7 that travels in substantial parallelism toward and from an opposite edge of the opening 4 in each instance. I prefer to pivot the shutter members, for which purpose an eyelet 8 is provided at the center of the bridge 3 on which eyelet both shutter members turn, the frictional resistance being sufficient to maintain them in any position of adjustment to which they are moved. The shutters preferably conform to the general contour of the bridge and adjacent portions of the eyepieces that they control, as shown in the drawings, so as not to project beyond the margins, but they may be still easily moved with the fingers.

In the form of the device shown in Fig. 4, the shutter members are provided, in addition to the obscuring edge 7, with stenopaic openings 9 so disposed as to act, if desired, in the same capacity as the edge 7, while at the same time possessing the functions of shortening up the slot or opening, the said openings 9 being of graduated lengths.

Referring next to Figs. 5 and 6, the obscuring edge 7 is there shown in the form of two converging lines that intersect at such a point that, as the shutter member is moved downwardly in the figure from the dotted to the full line position, the slot 4 is progressively shortened from end to end until a substantially regular, as distinguished from an oblong, opening of any desired minuteness is obtained. It is here shown, also, that the eyepieces 1—1 may also be pivoted on the eyelet 8 to move relatively to each other, while in lieu of the handle 4, nose-engaging flaps 10 are provided which may be formed from extensions on the shutter members 6 rather than upon the eyepieces.

In Fig. 7, the obscuring edges 7 of the shutters are made semi-circular to vary, in an obvious way, the final restriction under the principle utilized in Fig. 5, and here, as in Fig. 4, the shutters are mounted on separate eyelets 11 at the sides, one of which eyelets is also used as a pivot for the handle 4. In Fig. 8, the modified form of shutter acts in much the same manner as does that of Fig. 4, but the several slots of the last mentioned figure are merged into one opening 12, having stepped end walls.

An exceedingly simple way of widening and narrowing the slots 4 is shown in Figs. 9 and 10, in which device the two long edges thereof are constituted by the free ends of flaps 13 that the flexibility of the paper or other material of which the device is composed permits of being swung toward or from each other so that the degree of inclination is varied and the opening between them controlled. In the process of adjustment, they are first spread out, whereafter they may be pressed lightly between the thumb and finger in successive trials until the desired minimum width of opening is obtained.

It will be noted that all of the parts of the device in all its forms may be blanked out from sheet material, black paper, as before suggested, being eminently suitable.

I claim as my invention:

1. A non-flicker device for viewing moving pictures comprising a pair of eyepieces composed of thin opaque material and each provided with a restricted sight opening of variable width.

2. A non-flicker device for viewing moving pictures comprising a pair of eyepieces composed of thin opaque material and each provided with a stenopaic slot of variable width.

3. A non-flicker device for viewing moving pictures comprising a pair of eyepieces composed of thin opaque material and each provided with a sight opening and with a movable shutter device for restricting the width of said opening.

4. A non-flicker device for viewing moving pictures comprising a pair of eyepieces composed of thin opaque material and each provided with a sight opening and with a pivoted shutter device arranged to swing across the latter for restricting the width of said opening.

5. A non-flicker device for viewing moving pictures comprising a pair of eyepieces composed of thin opaque material and each provided with a sight opening and with a pivoted shutter device arranged to swing across the latter for restricting the width of said opening, both shutter devices being mounted upon the same pivot.

6. A non-flicker device for viewing moving pictures composed of a thin sheet of opaque material formed into a pair of eyepieces partially separated by a space adapted to accommodate the nose of the wearer and otherwise connected by a bridging portion having a centrally arranged eyelet, each eyepiece being provided with a sight opening and with a shutter device movably mounted on the eyelet for restricting the width of the sight opening.

7. A non-flicker device for viewing moving pictures composed of a thin sheet of opaque material formed into a pair of eyepieces partially separated by a space adapted to accommodate the nose of the wearer and otherwise connected by a bridging portion having a centrally arranged pivot, each eyepiece being provided with a sight opening and with a shutter device arranged to swing on the pivot for the purpose of restricting the width of the sight opening.

HENRY F. STOWELL.

Witnesses:
Russell B. Griffith,
Agnes Nesbitt Bissell.